United States Patent
Lu et al.

(10) Patent No.: US 10,964,476 B2
(45) Date of Patent: Mar. 30, 2021

(54) CAPACITOR WITH MULTIPLE DIELECTRIC LAYERS HAVING DIELECTRIC POWDER AND POLYIMIDE

(71) Applicant: INDUSTRIAL TECHNOLOGY RESEARCH INSTITUTE, Hsinchu (TW)

(72) Inventors: Chun-An Lu, New Taipei (TW); Ying-Jung Chiang, Hsinchu (TW); Yuan-Ling Tsai, Xizhou Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/234,015

(22) Filed: Dec. 27, 2018

(65) Prior Publication Data
US 2020/0211771 A1    Jul. 2, 2020

(51) Int. Cl.
*H01G 4/33* (2006.01)
*H01G 4/12* (2006.01)
(Continued)

(52) U.S. Cl.
CPC ............ *H01G 4/1227* (2013.01); *H01B 3/002* (2013.01); *H01G 4/258* (2013.01); *H01G 4/306* (2013.01); *H01G 4/33* (2013.01); *H01G 4/008* (2013.01)

(58) Field of Classification Search
CPC ........ H01G 4/33; H01G 4/306; H01G 4/1227; H01G 4/206
See application file for complete search history.

(56) References Cited

U.S. PATENT DOCUMENTS

| | | | |
|---|---|---|---|
| 6,150,456 A | * | 11/2000 | Lee .................... B32B 27/34 524/606 |
| 6,657,849 B1 | * | 12/2003 | Andresakis ............ H05K 1/162 361/303 |

(Continued)

FOREIGN PATENT DOCUMENTS

| CN | 100357496 C | 12/2007 |
|---|---|---|
| JP | 2012232435 A * | 11/2012 |

(Continued)

OTHER PUBLICATIONS

Office Action for Taiwanese application No. 107147368, dated Mar. 28, 2019.

(Continued)

*Primary Examiner* — David M Sinclair
(74) *Attorney, Agent, or Firm* — Birch, Stewart, Kolasch & Birch, LLP

(57) ABSTRACT

A capacitor is provided. The capacitor includes a first electrode layer and a second electrode layer; and a first dielectric layer and a second dielectric layer, wherein the first dielectric layer and the second dielectric layer are disposed between the first electrode layer and the second electrode layer. The first dielectric layer includes a first dielectric powder and a first organic resin, and the second dielectric layer includes a second dielectric powder and a second organic resin. In particular, the weight ratio of the first dielectric powder to the first organic resin is greater than the weight ratio of the second dielectric powder to the second organic resin.

9 Claims, 9 Drawing Sheets

(51) Int. Cl.
*H01B 3/00* (2006.01)
*H01G 4/30* (2006.01)
*H01G 4/258* (2006.01)
*H01G 4/008* (2006.01)

(56) References Cited

U.S. PATENT DOCUMENTS

| | | | |
|---|---|---|---|
| 7,324,329 | B2 | 1/2008 | Dweik et al. |
| 7,381,468 | B2 | 6/2008 | Paik et al. |
| 7,561,406 | B2 | 7/2009 | Saita et al. |
| 7,883,905 | B2 | 2/2011 | Saita et al. |
| 8,315,038 | B2 | 11/2012 | Saita et al. |
| 8,339,766 | B2 | 12/2012 | Yano et al. |
| 8,390,984 | B2 | 3/2013 | Liu et al. |
| 8,477,474 | B2 | 7/2013 | Yoshizawa et al. |
| 9,030,800 | B2 | 5/2015 | Namikawa et al. |
| 9,111,681 | B2 | 8/2015 | Saita et al. |
| 2005/0161149 | A1 | 7/2005 | Yokota et al. |
| 2005/0199681 | A1* | 9/2005 | Lee ............ H05K 1/162 228/101 |
| 2010/0302707 | A1 | 12/2010 | Tan et al. |
| 2010/0309607 | A1* | 12/2010 | Liu ............ H01G 4/1227 361/313 |
| 2015/0014028 | A1* | 1/2015 | Lee ............ B32B 15/085 174/257 |
| 2016/0027579 | A1 | 1/2016 | Kurachi et al. |
| 2016/0027587 | A1 | 1/2016 | Furukawa et al. |
| 2016/0099109 | A1* | 4/2016 | Saito ........... H01G 4/306 361/301.4 |
| 2016/0329152 | A1 | 11/2016 | Takeda et al. |
| 2018/0257327 | A1* | 9/2018 | Ponting ........ H01G 4/18 |

FOREIGN PATENT DOCUMENTS

| | | |
|---|---|---|
| TW | 573306 B | 1/2004 |
| TW | I270580 | 1/2007 |
| TW | I394189 B1 | 4/2013 |

OTHER PUBLICATIONS

Luo et al., "Fabrication, characterization, properties and theoretical analysis of ceramic/PVDF composite flexible films with high dielectric constant and low dielectric loss", Journal of Materials Chemistry A, 2014, vol. 2, pp. 510-519.

* cited by examiner

CAPACITOR WITH MULTIPLE DIELECTRIC LAYERS HAVING DIELECTRIC POWDER AND POLYIMIDE

TECHNICAL FIELD

The disclosure relates to a capacitor.

BACKGROUND

Capacitors are electrical devices capable of storing or absorbing electrical charges. With their charge-storing capacity, capacitors have broad application in the design and operation of electrical circuits, including integrated circuits ("ICs"). In recent years, along with miniaturization and high integration of electrical circuits, the requirement for minimizing capacitors used in various electrical circuits has increased.

The development of compact thin film capacitors has been hindered, since conventional dielectric material (such as silicon oxide or silicon nitride) exhibits a low dielectric constant. Accordingly, in order to realize a compact thin film capacitor with a relatively high capacity, a dielectric material with a high dielectric constant should be employed. Dielectric material with a high dielectric constant is not generally a temperature compensating material, however. Therefore, the thin film capacitor exhibits an increased capacitance change rate when operated at various temperatures. In addition, capacitors should exhibit good DC bias characteristics (also referred to as the voltage coefficient of capacitance (VCC)) defined as the capacitance change rate with a change in DC bias (voltage)). If a capacitor exhibits poor DC bias characteristics, the capacitance of the capacitor would be greatly reduced during operation at high voltage, resulting in problems up to and including failure of the capacitor.

Therefore, a novel thin film capacitor is required to solve the aforementioned problems.

SUMMARY

According to embodiments of the disclosure, the disclosure provides a capacitor. The capacitor includes a first electrode layer and a second electrode layer; and, a first dielectric layer and a second dielectric layer, disposed between the first electrode layer and the second electrode layer. The first dielectric layer includes a first dielectric powder and a first organic resin, and the second dielectric layer consists of a second dielectric powder and a second organic resin. In particular, the weight ratio of the first dielectric powder to the first organic resin is greater than the weight ratio of the second dielectric powder to the second organic resin.

A detailed description is given in the following embodiments with reference to the accompanying drawings.

DETAILED DESCRIPTION

The disclosure provides a capacitor (such as thin film capacitor). By means of specific dielectric powder content of the first dielectric layer and the second dielectric layer (disposed between a first electrode layer and a second electrode layer), the capacitor of the disclosure exhibits flexibility and can be transformed into a thinned configuration. According to embodiments of the disclosure, in the capacitor, the weight ratio of dielectric powder to organic resin of the first dielectric layer and the weight ratio of dielectric powder to organic resin of the second dielectric layer can be both within a specific range. According to embodiments of the disclosure, in the capacitor, the thickness of the first dielectric layer and the thickness of the second dielectric layer can be both within a specific range. Accordingly, the capacitor of the disclosure can have superior DC bias characteristics and satisfy the X7R TCC (temperature coefficient of capacitance) requirements (have a capacitance change rate over a temperature range of −55° C. to 125° C., which does not vary by more than ±15% from the capacitance at 25° C.) standardized by Electronics Industry Alliance (EIA).

According to embodiments of the disclosure, the capacitor of the disclosure can be applied in flexible light-emitting diode package substrate, flexible touch panel, flexible display or wearable devices, besides high-power chips, thin packages and electrical circuits.

Figure 1:
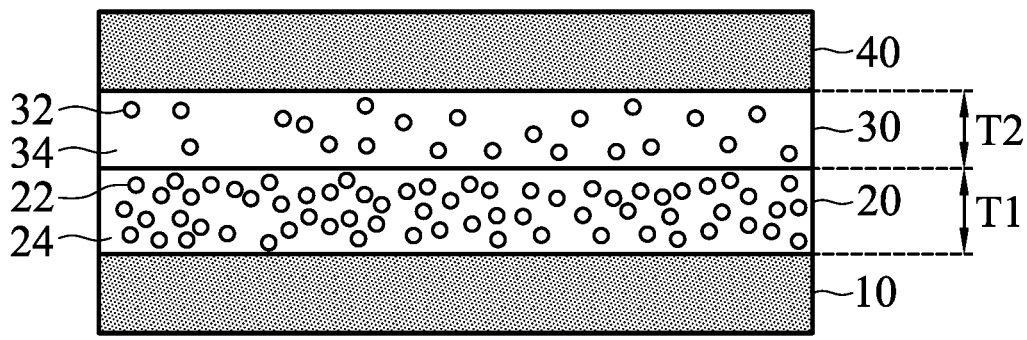
FIG. 1 is a cross-sectional view of a capacitor according an embodiment of the disclosure.
Figure 2:
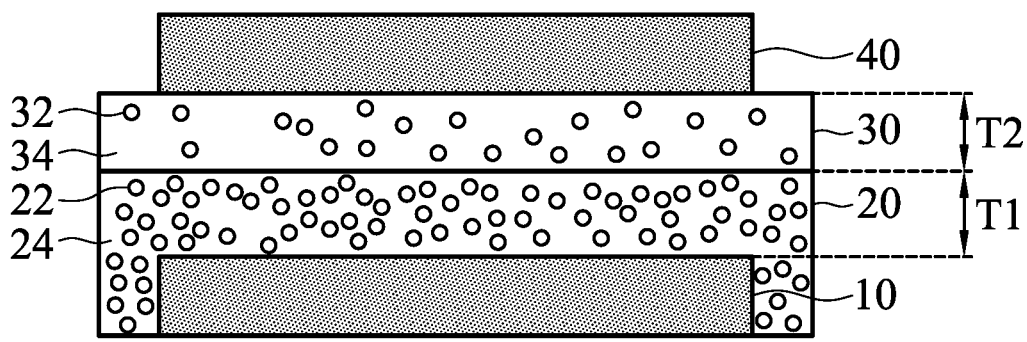
FIG. 2 is a cross-sectional view of a capacitor according an embodiment of the disclosure.

FIG. 1 is a cross-sectional view of a capacitor 100 according an embodiment of the disclosure. The capacitor 100 includes a first electrode layer 10, a first dielectric layer 20, a second dielectric layer 30, and a second electrode layer 40, wherein the first dielectric layer 20 and the second dielectric layer 30 are disposed between the first electrode layer 10 and the second electrode layer 40. The first dielectric layer 20 includes a first dielectric powder 22 and a first organic resin 24, wherein the first dielectric powder 22 is distributed among the first organic resin 24. The second dielectric layer 30 consists of a second dielectric powder 32 and a second organic resin 34, wherein the second dielectric powder 32 is distributed among the second organic resin 34. The first dielectric layer 20 can directly contact the second dielectric layer 30 (i.e. there is no layer or intermedium between the first dielectric layer 20 and the second dielectric layer 30). The first dielectric layer 20 can directly contact the first electrode layer 10 (i.e. there is no layer or intermedium between the first dielectric layer 20 and the first electrode layer 10). The second dielectric layer 30 can directly contact the second electrode layer 40 (i.e. there is no layer or intermedium between the second dielectric layer 30 and the second electrode layer 40). In this embodiment, the weight ratio R1 of the first dielectric powder 22 to the first organic resin 24 is greater than the weight ratio R2 of the second dielectric powder 32 to the second organic resin 34. As a result, the dielectric structure consisting of a first dielectric layer 20 and a second dielectric layer 30 exhibits superior dielectric powder accumulation, insulating characteristic, and reliability. Therefore, the capacitor of the disclosure exhibits flexibility and superior capacitor performance.

According to embodiments of the disclosure, in the first dielectric layer 20, the weight ratio R1 of the first dielectric powder 22 to the first organic resin 24 can be not less than 2.0, such as from 2.0 to 11.6, from 2.14 to 11.6, or from 2.14 to 7.5. When the weight ratio R1 of the first dielectric powder 22 to the first organic resin 24 is too high or too low, the capacitance change rate of the capacitor may be increased during operation under high temperature or high bias voltage.

According to embodiments of the disclosure, when the weight ratio R1 of the first dielectric powder 22 to the first organic resin 24 is not less than 2.0, the weight ratio R2 of the second dielectric powder 32 to the second organic resin 34 can be not greater than about 1, such as from 0.1 to 1, from 0.2 to 1, or from 0.43 to 1.

According to some embodiments of the disclosure, the first dielectric layer 20 consists of the first dielectric powder 22 and the first organic resin 24, wherein the first dielectric powder 22 is distributed among the first organic resin 24. The second dielectric layer 30 consists of the second dielectric powder 32 and the second organic resin 34, wherein second dielectric powder 32 is distributed among the second organic resin 34.

According to embodiments of the disclosure, the first dielectric powder can be barium titanate, strontium titanate, barium strontium titanate, or a combination thereof. The first dielectric powder can have an average particle size from about 30 nm to 2 µm, such as 50 nm, 100 nm, 150 nm, 200 nm, 250 nm, 300 nm, 500 nm, 800 nm, 1 µm or 1.5 µm. In addition, the second dielectric powder can be barium titanate, strontium titanate, barium strontium titanate, or a combination thereof. The second dielectric powder can have an average particle size from about 30 nm to 2 µm, such as 50 nm, 100 nm, 150 nm, 200 nm, 250 nm, 300 nm, 500 nm, 800 nm, 1 µm or 1.5 µm. According to embodiments of the disclosure, the first dielectric powder can be the same as or different from the second dielectric powder, and the particle size of the first dielectric powder can be the same as or different from the particle size of the second dielectric powder.

According to embodiments of the disclosure, the first organic resin can be acrylic acid resin, polyimide, polymethyl methacrylate, polyvinylpyrrolidone, polystyrene, polyvinylidene fluoride, or a combination thereof; and, second organic resin can be acrylic acid resin, polyimide, polymethyl methacrylate, polyvinylpyrrolidone, polystyrene, polyvinylidene fluoride, or a combination thereof. According to embodiments of the disclosure, the first organic resin can be the same as or different from the second organic resin. According to embodiments of the disclosure, the first organic resin can have a number average molecular weight from about 5,000 to 300,000, such as from about 10,000 to 250,000, from about 50,000 to 200,000, or from about 80,000 to 180,000; and, the second organic resin can have a number average molecular weight from about 5,000 to 300,000, such as from about 10,000 to 250,000, from about 50,000 to 200,000, or from about 80,000 to 180,000.

According to embodiments of the disclosure, the first electrode layer can be aluminum, silver, gold, copper, nickel, platinum, or an alloy thereof. The first electrode layer can have a thickness from about 10 nm to 100 µm. The second electrode layer can be aluminum, silver, gold, copper, nickel, platinum, or an alloy thereof. The second electrode layer can have a thickness from about 10 nm to 100 µm. According to embodiments of the disclosure, the first electrode layer can be the same as or different from the second electrode layer.

The thickness of the first electrode layer can be the same as or different from the thickness of the second electrode layer.

As still shown in FIG. 1, the first dielectric layer 20 has a thickness T1, wherein the thickness T1 means the minimum distance from the interface between the first dielectric layer 20 and the second dielectric layer 30 to the interface between the first dielectric layer 20 and the first electrode layer 10. The second dielectric layer 30 has a thickness T2, wherein the thickness T2 means the minimum distance from the interface between the second dielectric layer 30 and the second electrode layer 40 to the interface from the second dielectric layer 30 to the first dielectric layer 20. According to embodiments of the disclosure, the thickness T1 of the first dielectric layer 20 is greater than the thickness T2 of the second dielectric layer 30. For example, the ratio of the thickness T1 of the first dielectric layer 20 to the thickness T2 of the second dielectric layer 30 can be from 1.05 to 6.5, such as 1.5, 2, 2.5, 3, 3.5, 4, 4.5, 5, or 6. When the ratio of the thickness T1 to the thickness T2 is too high, the flexibility of the capacitor would be reduced, and the capacitance change rate of the capacitor may be increased during operation under high temperature or high bias voltage. When the ratio of the thickness T1 to the thickness T2 is too low, the capacitance of the capacitor would be reduced, and the capacitance change rate of the capacitor may be increased during operation under high temperature or high bias voltage.

According to embodiments of the disclosure, the thickness of the first dielectric layer can be from 0.105 µm to 52.5 µm, such as 5 µm, 10 µm, 15 µm, 20 µm, 25 µm, 30 µm, 35 µm, 40 µm, 45 µm, or 50 µm. The thickness of the second dielectric layer can be from 0.1 µm to 50 µm, such as 3 µm, 5 µm, 8 µm, 10 µm, 12 µm, 15 µm, 20 µm, 25 µm, or 30 µm.

According to embodiments of the disclosure, since the capacitor of the disclosure has a two-layer dielectric structure and a specific content of dielectric powder, the capacitor of the disclosure can function properly at a bias of 100V. Furthermore, the capacitor exhibits a capacitance change rate not greater than ±10% at a bias of 100V. Herein, the capacitance change rate of the capacitor at a specific bias voltage is determined using the following equation:

$$\text{capacitance change rate} = \frac{C_o - C_v}{C_o} \times 100\%,$$

wherein $C_o$ is the capacitance of the capacitor before applying a bias voltage, and $C_v$ is the capacitance of the capacitor at a specific bias voltage.

According to embodiments of the disclosure, since the capacitor of the disclosure has a two-layer dielectric structure and a specific content of dielectric powder, the capacitor of the disclosure satisfies the X7R TCC (temperature coefficient of capacitance) requirements standardized by Electronics Industry Alliance (EIA). Namely, the capacitor has a capacitance change rate, which does not vary by more than ±15%, over a temperature range of −55° C. to 125° C. Herein, the capacitance change rate of the capacitor at a specific temperature is determined using the following equation:

$$\text{capacitance change rate} = \frac{C_o - C_t}{C_o} \times 100\%,$$

wherein $C_0$ is the capacitance of the capacitor at 25° C., and $C_t$ is the capacitance of the capacitor at a specific temperature.

Figure 3:
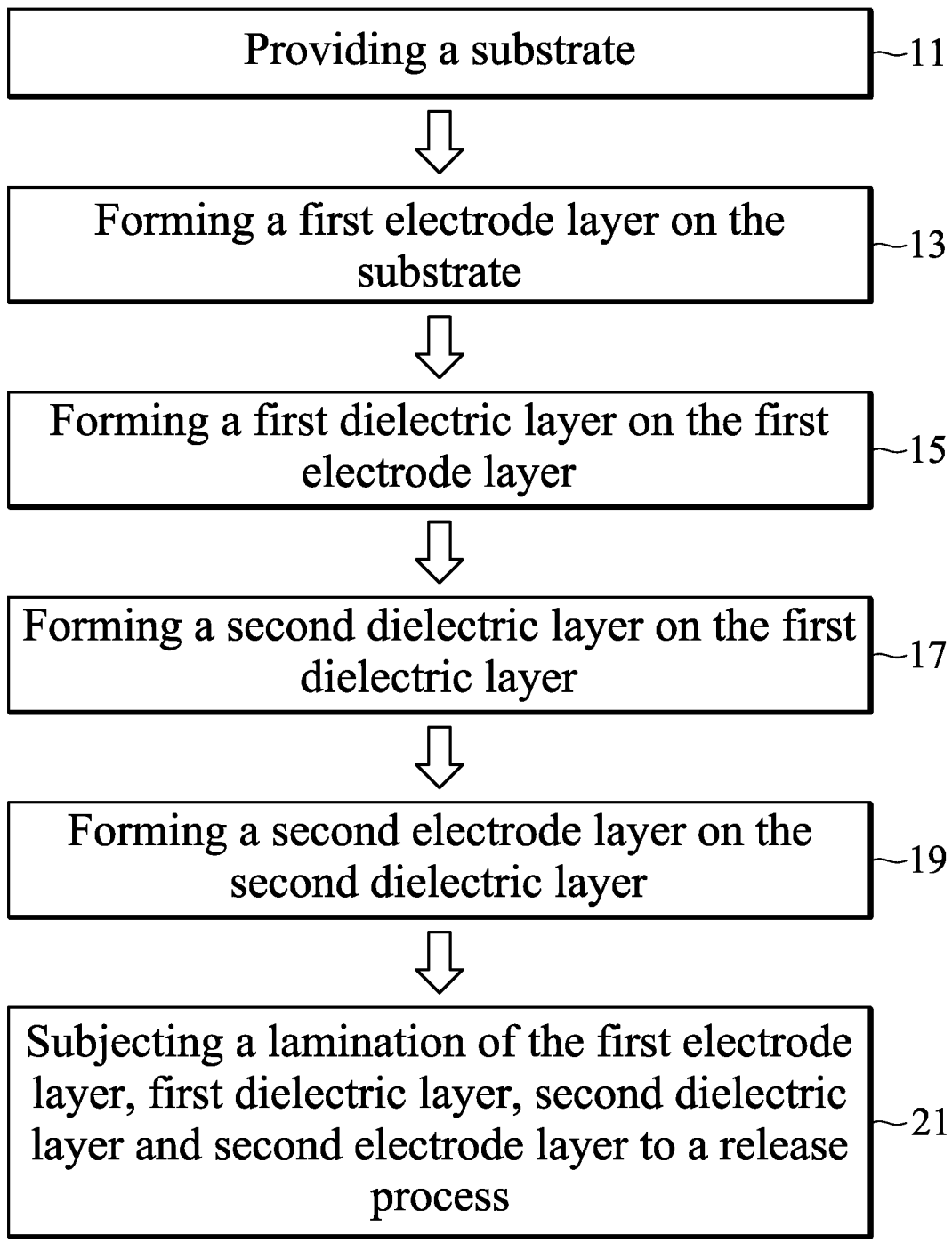
FIG. 3 is a flow chart illustrating a method for fabricating the capacitor according to an embodiment of the disclosure.
Figure 4A:
FIGS. 4A-4F are cross-sectional views showing the fabricating process of the capacitor of FIG. 2.

According to embodiments of the disclosure, the disclosure also provides a method for fabricating the aforementioned capacitor. FIG. 3 is a flow chart illustrating a method for fabricating the capacitor according to an embodiment of the disclosure. FIGS. 4A-4F are cross-sectional views showing the fabricating process of the capacitor of the disclosure. First, as shown in FIG. 4A, a substrate 50 is provided (step 11), wherein the substrate 50 can be, for example, a glass substrate, or plastic substrate.

Figure 4B:
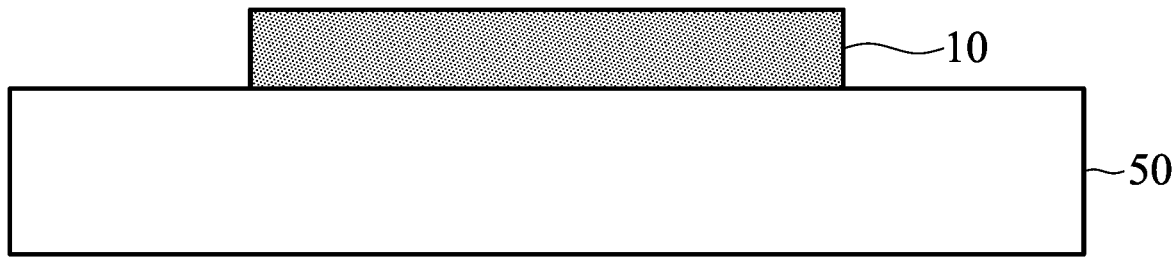

Next, as shown in FIG. 4B, a first electrode layer 10 is formed on the substrate 50 (step 13), wherein the formation of the first electrode layer 10 can be accomplished by coating, spraying, printing, chemical vapor deposition (CVD), physical vapor deposition (PVD), or sputtering. The first electrode layer 10 is the same as defined above.

Figure 4C:
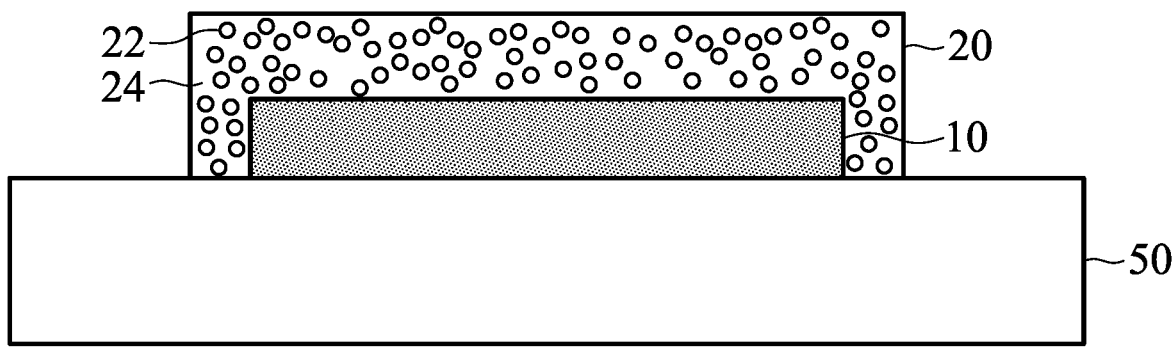

Next, a first dielectric layer 20 is formed on the first electrode layer 10 (step 15). For example, a first coating consisting of a first composition is formed on the first electrode layer 10, and then the first coating is subjected to a first baking process, obtaining a first dielectric layer 20, as shown in FIG. 4C. The first composition includes the first dielectric powder 22, the first organic resin 24, and a solvent (such as acetone, methylethyl ketone, methylpyrrolidine, dimethylformamide, dimethylacetamide (DMAc), or a combination thereof), wherein the first dielectric powder 22 and the first organic resin 24 are uniformly dispersed in the solvent. After the first baking process, the solvent in the first coating is removed, obtaining the first dielectric layer 20. According to embodiments of the disclosure, the first composition can have a solid content (i.e. the weight percentage of the first dielectric powder and the first organic resin, based on the total weight of the first composition) from 5 wt % to 90 wt %. The formation of the first coating can be, for example, accomplished by screen printing, spin coating, bar coating, blade coating, roller coating, dip coating, spray coating, or brush coating. The first dielectric powder 22, the first organic resin 24 and the first dielectric layer 20 are the same as defined above. According to embodiments of the disclosure, the first baking process includes, for example, baking at 50° C.-100° C. for 5 min-60 min, baking at 100° C.-200° C. for 5 min-60 min, and baking at 200° C.-250° C. for 5 min-60 min.

Figure 4D:
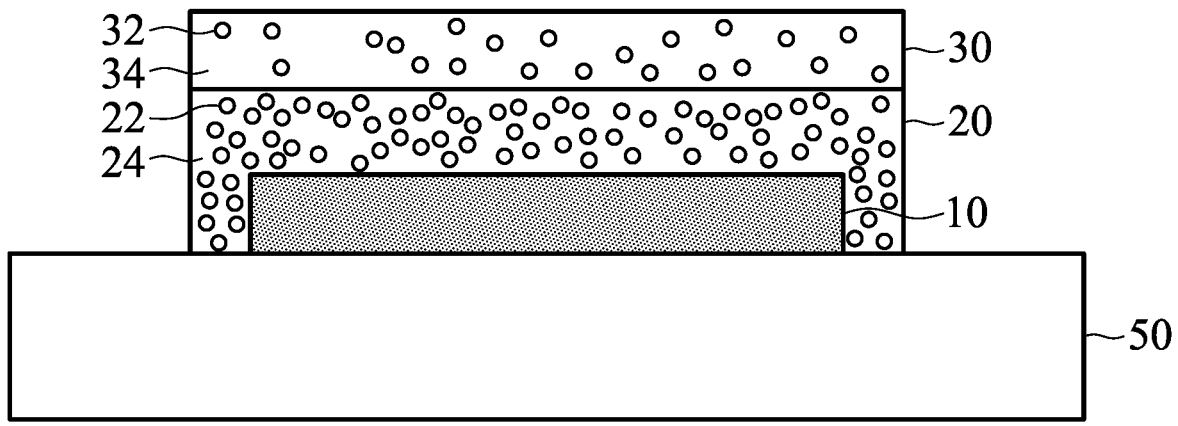

Next, a second dielectric layer 30 is formed on the first dielectric layer 20 (step 17). For example, a second coating consisting of a second composition is formed on the first dielectric layer 20, and then the second coating is subjected to a second baking process, obtaining a second dielectric layer 30, as shown in FIG. 4D. The second composition includes a second dielectric powder 32, a second organic resin 34, and a solvent (such as acetone, methylethyl ketone, methylpyrrolidine, dimethylformamide, dimethylacetamide (DMAc), or a combination thereof), wherein the second dielectric powder 32 and the second organic resin 34 are uniformly dispersed in the solvent. After the second baking process, the solvent in the second coating is removed, obtaining the second dielectric layer 30. According to embodiments of the disclosure, the second composition can have a solid content (i.e. the weight percentage of the second dielectric powder and the second organic resin, based on the total weight of the second composition) from 5 wt % to 90 wt %. The formation of the second coating can be, for example, accomplished by screen printing, spin coating, bar coating, blade coating, roller coating, dip coating, spray coating, or brush coating. The second dielectric powder 32, the second organic resin 34 and the second dielectric layer 30 are the same as defined above. According to embodiments of the disclosure, the second baking process includes, for example, baking at 50° C.-100° C. for 5 min-60 min, baking at 100° C.-180° C. for 5 min-60 min, baking at 180° C.-280° C. for 5 min-60 min, baking at 280° C.-380° C. for 5 min-60 min, and baking at 380° C.-420° C. for 5 min-60 min.

Figure 4E:
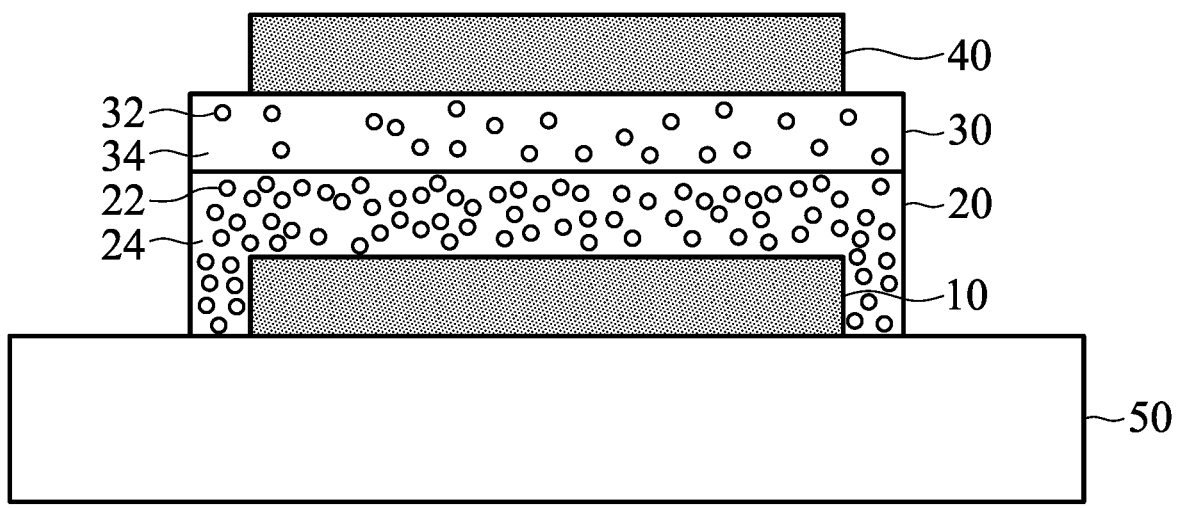

Next, as shown in FIG. 4E, a second electrode layer 40 is formed on the second dielectric layer (step 19), wherein the formation of the second electrode layer 40 can be accomplished by coating, spraying, printing, chemical vapor deposition (CVD), physical vapor deposition (PVD), or sputtering. The second electrode layer 40 is the same as defined above.

Figure 4F:
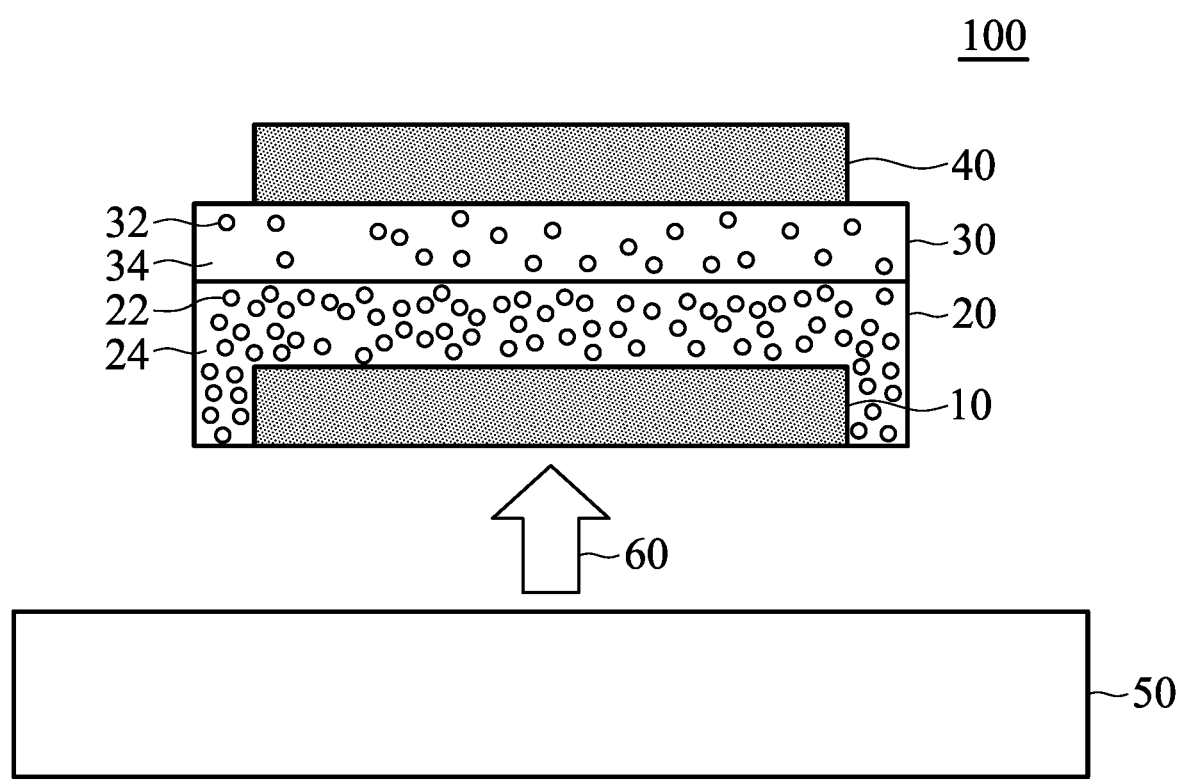

Finally, as shown in FIG. 4F, the lamination of the first electrode layer 10, the first dielectric layer 20, the second dielectric layer 30, and the second electrode layer 40 is subjected to a release process 60 (step 21), obtaining the capacitor of the disclosure 100.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLE 1

First, a glass substrate was provided, and then a first electrode layer (silver electrode, with a thickness of about 0.4 μm) was formed on the glass substrate by coating.

Next, barium titanate powder (with an average particle size of about 60 nm), hydrophilic polyimide (commercially available from Microcosm Technology Co., LTD., with a trade number of 1098) (having a number average molecular weight of about 100,000), and dimethylacetamide were mixed, obtaining a mixture. The weight ratio of barium titanate to hydrophilic polyimide was 7. Next, the mixture was ground using a three-roller mill, and then defoamed by a defoaming device, obtaining a first composition (with a solid content of 10 wt %). Next, a first coating of the first composition was formed on the first electrode layer by coating. Next, the first coating was baked at 80° C. for 15 min, at 150° C. for 30 min, and at 210° C. for 30 min, obtaining a first dielectric layer with a thickness of 45 μm. In particular, in the first dielectric layer, the weight ratio of barium titanate to hydrophilic polyimide was 7.

Next, barium titanate powder (with an average particle size of about 60 nm), hydrophilic polyimide (commercially available from Microcosm Technology Co., LTD., with a trade number of 1098) (having a number average molecular weight of about 100,000) and dimethylacetamide were mixed, obtaining a mixture, wherein the weight ratio of barium titanate to hydrophilic polyimide was 1. Next, the mixture was ground using a three-roller mill, and then defoamed by a defoaming device, obtaining a second composition (with a solid content of 10 wt %). Next, a second coating of the second composition was formed on the first electrode layer by coating. Next, the second coating was baked at 50° C. for 30 min, at 150° C. for 30 min, at 200° C. for 30 min, at 200° C. for 30 min, and at 400° C. for 30 min, obtaining a second dielectric layer with a thickness of 8 μm. In particular, in second dielectric layer, the weight ratio of barium titanate to hydrophilic polyimide was 1.

Next, a second electrode layer (silver electrode, with a thickness of about 0.4 μm) was formed on the second dielectric layer by coating.

Finally, the lamination of the first electrode layer 10, the first dielectric layer 20, the second dielectric layer 30, and the second electrode layer 40 was subjected to a release process, obtaining Capacitor (1).

Figure 5:
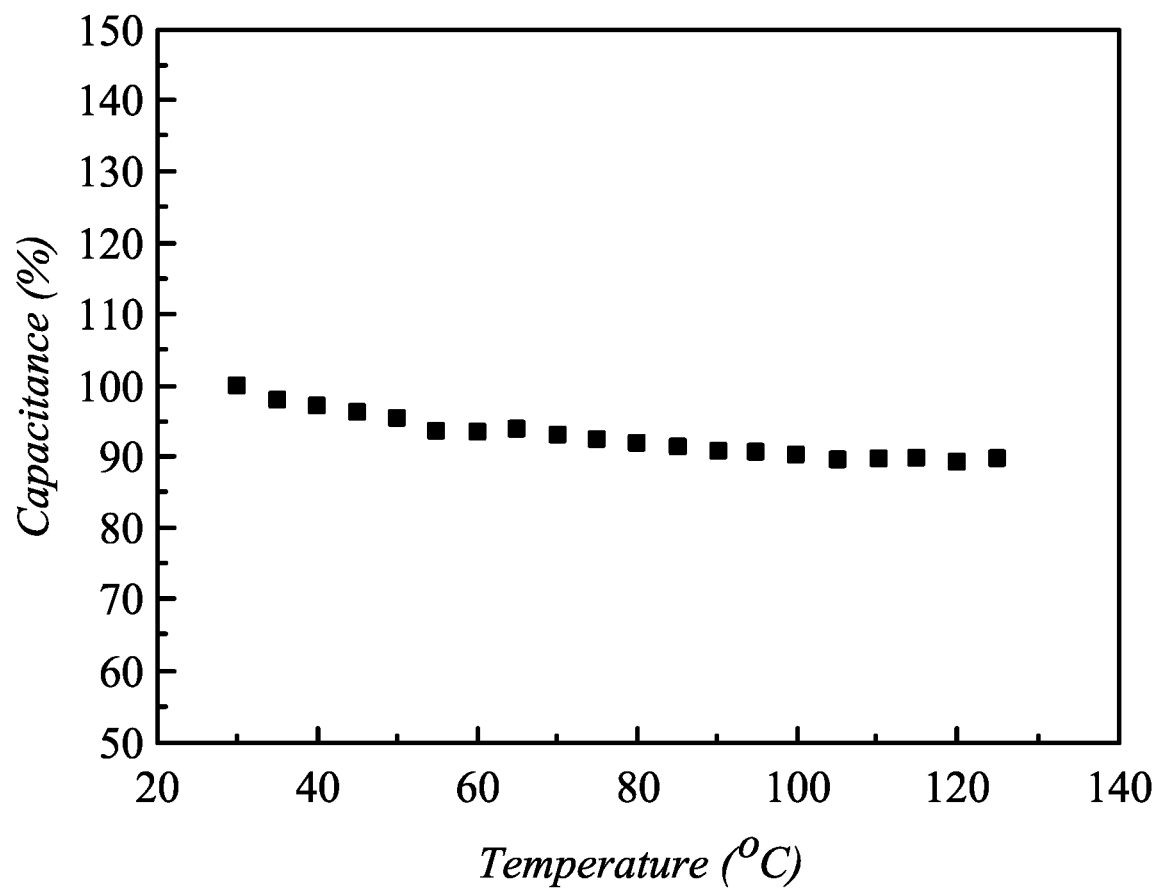
FIG. 5 is a graph plotting capacitance of the capacitor as disclosed in Example 1 against temperature.
Figure 6:
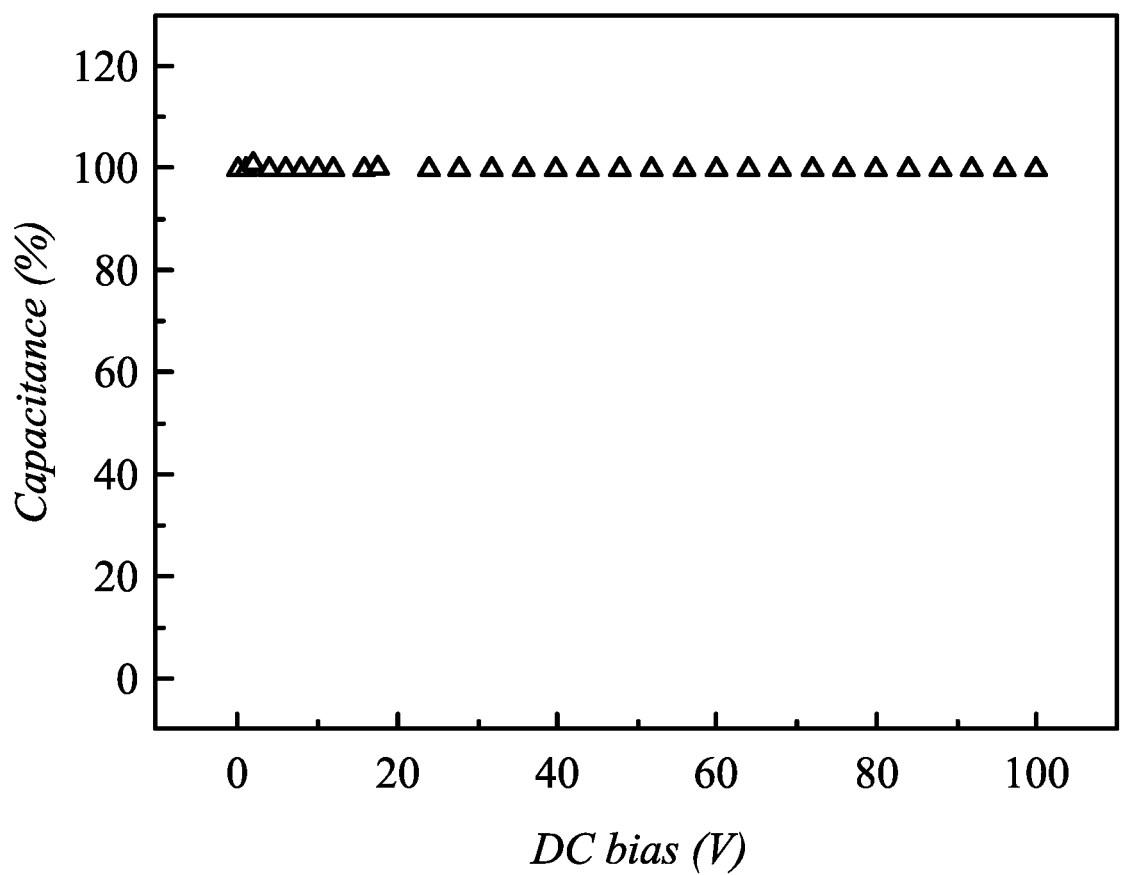
FIG. 6 is a graph plotting capacitance of the capacitor as disclosed in Example 1 against DC bias.

Next, the capacitance of Capacitor (1) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (1) was determined by the capacitance (the capacitance of the Capacitor (1) at 25° C. was considered as 100%). The results are shown in FIG. 5 and Table 1. In addition, the capacitance of Capacitor (1) was measured by LCR (inductor-capacitor-resistor) meter (Microtest 6377 LCR) at 25° C. over a DC bias range of 0V to 100V and the capacitance change rate of Capacitor (1) was determined by the capacitance (the capacitance of the Capacitor (1) at 0V was considered as 100%). The results are shown in FIG. 6 and Table 1.

COMPARATIVE EXAMPLE 1

Comparative Example 1 was performed in the same manner as in Example 1 except that the second composition of Comparative Example 1 was free of barium titanate powder (i.e. the second composition consisted of hydrophilic polyimide (commercially available from Microcosm Technology Co., LTD., with a trade number of 1098) (having a number average molecular weight of about 100,000) and dimethylacetamide (the solid content of the second composition was 10 wt %), obtaining Capacitor (2).

Figure 7:
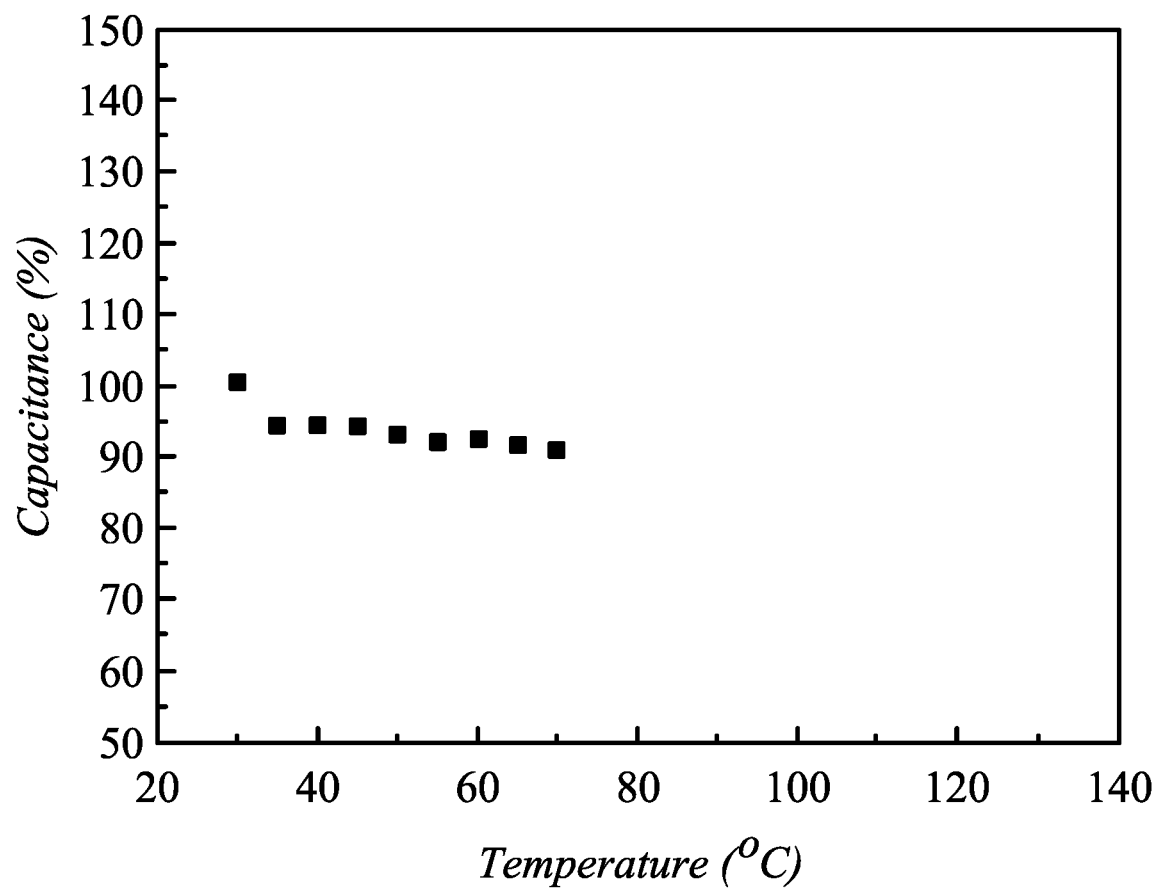
FIG. 7 is a graph plotting capacitance of the capacitor as disclosed in Comparative Example 1 against temperature.
Figure 8:
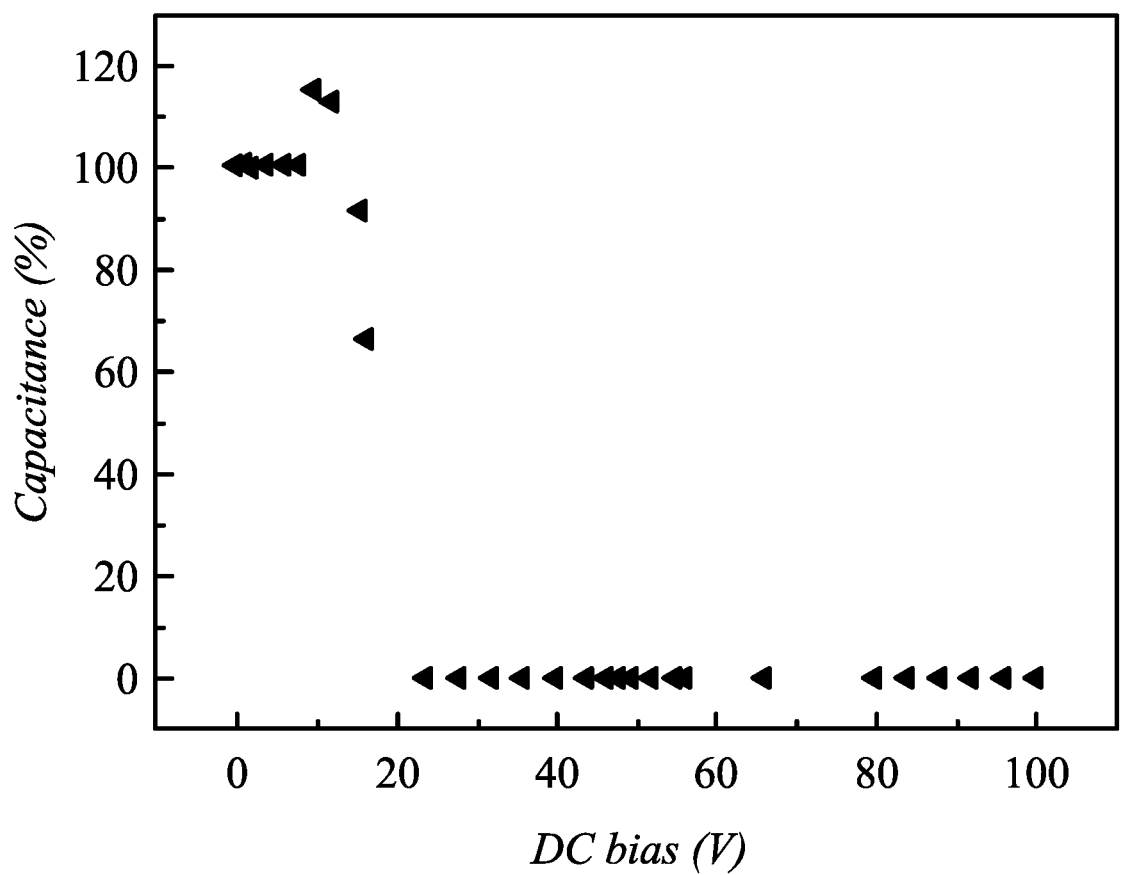
FIG. 8 is a graph plotting capacitance of the capacitor as disclosed in Comparative Example 1 against DC bias.

Next, the capacitance of Capacitor (2) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (2) was determined by the capacitance (the capacitance of the Capacitor (2) at 25° C. was considered as 100%). The results are shown in FIG. 7 and Table 1. In addition, the capacitance of Capacitor (2) was measured by LCR (inductor-capacitor-resistor) meter (Microtest 6377 LCR) at 25° C. over a DC bias range of 0V to 100V and the capacitance change rate of Capacitor (2) was determined by the capacitance (the capacitance of the Capacitor (2) at 0V was considered as 100%). The results are shown in FIG. 8 and Table 1.

TABLE 1

|  | Weight ratio of barium titanate to polyimide (first dielectric layer) | Thickness of first dielectric layer thickness | Weight ratio of barium titanate to polyimide (second dielectric layer) | Thickness of second dielectric layer thickness | Capacitance change rate (%) (at 125° C.) | Capacitance change rate (%) (at DC bias of 100 V) |
|---|---|---|---|---|---|---|
| Example 1 | 87.5:12.5 | 45 μm | 50:50 | 8 μm | <1 | ~10 |
| comparative example 1 | 87.5:12.5 | 45 μm | 0:100 | 8 μm | unable-to-measure (failure at about 70° C.) | unable-to-measure (failure at 15 V) |

EXAMPLE 2

Example 2 was performed in the same manner as in Example 1 except that the weight ratio of barium titanate to hydrophilic polyimide in the first composition was reduced from 7 to 6, obtaining Capacitor (3).

Next, the capacitance of Capacitor (3) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (3) was determined by the capacitance (the capacitance of the Capacitor (3) at 25° C. was considered as 100%). The results are shown in Table 2. In addition, the capacitance of Capacitor (3) was measured by LCR (inductor-capacitor-resistor) meter (Microtest 6377 LCR) at 25° C. over a DC bias range of 0V to 100V and the capacitance change rate of Capacitor (3) was determined by the capacitance (the capacitance of the Capacitor (3) at 0V was considered as 100%). The results are shown in Table 2.

COMPARATIVE EXAMPLE 2

Comparative Example 2 was performed in the same manner as in Example 2 except that the second composition of Comparative Example 1 was free of barium titanate powder (i.e. the second composition consisted of hydrophilic polyimide (commercially available from Microcosm Technology Co., LTD., with a trade number of 1098) (having a number average molecular weight of about 100,000) and dimethylacetamide (the solid content of the second composition was 10 wt %), obtaining Capacitor (4).

Next, the capacitance of Capacitor (4) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (4) was determined by the capacitance (the capacitance of the Capacitor (4) at 25° C. was considered as 100%). The results are shown in Table 2. In addition, the capacitance of Capacitor (4) was measured by LCR (inductor-capacitor-resistor) meter (Microtest 6377 LCR) at 25° C. over a DC bias range of 0V to 100V and the capacitance change rate of Capacitor (4) was determined by the capacitance (the capacitance of the Capacitor (4) at 0V was considered as 100%). The results are shown in Table 2.

EXAMPLE 3

Example 3 was performed in the same manner as in Example 1 except that the weight ratio of barium titanate to hydrophilic polyimide in the first composition was reduced from 7 to 5 and the weight ratio of barium titanate to hydrophilic polyimide in the second composition was reduced from 1 to 0.43, obtaining Capacitor (5).

Next, the capacitance of Capacitor (5) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (5) was determined by the capacitance (the capacitance of the Capacitor (5) at 25° C. was considered as 100%). The results are shown in Table 2. In addition, the capacitance of Capacitor (5) was measured by LCR (inductor-capacitor-resistor) meter (Microtest 6377 LCR) at 25° C. over a DC bias range of 0V to 100V and the capacitance change rate of Capacitor (5) was determined by the capacitance (the capacitance of the Capacitor (5) at 0V was considered as 100%). The results are shown in Table 3.

EXAMPLE 4

Example 4 was performed in the same manner as in Example 3 except that the thickness of the first dielectric layer was reduced from 45 µm to 15 µm, obtaining Capacitor (6).

Next, the capacitance of Capacitor (6) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (6) was determined by the capacitance (the capacitance of the Capacitor (6) at 25° C. was considered as 100%). The results are shown in Table 3. In addition, the capacitance of Capacitor (6) was measured by LCR (inductor-capacitor-resistor) meter (Microtest 6377 LCR) at 25° C. over a DC bias range of 0V to 100V and the capacitance change rate of Capacitor (6) was determined by the capacitance (the capacitance of the Capacitor (6) at 0V was considered as 100%). The results are shown in Table 3.

COMPARATIVE EXAMPLE 3

First, a glass substrate was provided, and then a first electrode layer (silver electrode, with a thickness of about 0.4 µm) was formed on the glass substrate by coating.

TABLE 2

| | Weight ratio of barium titanate to polyimide (first dielectric layer) | Thickness of first dielectric layer | Weight ratio of barium titanate to polyimide (second dielectric layer) | Thickness of second dielectric layer | Capacitance change rate (%) (at 125° C.) | Capacitance change rate (%) (at DC bias of 100 V) |
|---|---|---|---|---|---|---|
| Example 2 | 85.7:14.3 | 45 µm | 50:50 | 8 µm | <1 | ~14.5 |
| Comparative Example 2 | 85.7:14.3 | 45 µm | 0:100 | 8 µm | unable-to-measure (failure at about 70° C.) | unable-to-measure (failure at 15 V) |

As shown in Table 1 and Table 2, the second dielectric layer, which is free of barium titanate, results in the capacitors failure during operation at 70° C. or at a DC bias of 100V.

Next, barium titanate powder (with an average particle size of about 60 nm), hydrophilic polyimide (commercially available from Microcosm Technology Co., LTD., with a trade number of 1098) (having a number average molecular weight of about 100,000), and dimethylacetamide were mixed, obtaining a mixture. The weight ratio of barium titanate to hydrophilic polyimide was 5. Next, the mixture was ground using a three-roller mill, and then defoamed by a defoaming device, obtaining a first composition (with a solid content of 10 wt %). Next, a first coating of the first composition was formed on the first electrode layer by coating. Next, the first coating was baked at 80° C. for 15 min, at 150° C. for 30 min, and at 210° C. for 30 min, obtaining a first dielectric layer with a thickness of 40 μm. In particular, in the first dielectric layer, the weight ratio of barium titanate to hydrophilic polyimide was 5.

Next, barium titanate powder (with an average particle size of about 60 nm), hydrophilic polyimide (commercially available from Microcosm Technology Co., LTD., with a trade number of 1098) (having a number average molecular weight of about 100,000), carbon powder (commercially available from Echo Chemical Co., LTD.) (having an average particle size of 100 nm) and dimethylacetamide were mixed, obtaining a mixture. The weight ratio of barium titanate to hydrophilic polyimide was 1, and the weight percentage of carbon powder was 1 wt % (based on the total weight of barium titanate and hydrophilic polyimide). Next, the mixture was ground using a three-roller mill, and then defoamed by a defoaming device, obtaining a second composition (with a solid content of 10 wt %). Next, a second coating of the second composition was formed on the first electrode layer by coating. Next, the second coating was baked at 50° C. for 30 min, at 150° C. for 30 min, at 200° C. for 30 min, at 200° C. for 30 min, and at 400° C. for 30 min, obtaining a second dielectric layer with a thickness of 8 μm. In particular, in second dielectric layer, the weight ratio of barium titanate to hydrophilic polyimide was 1.

Next, a second electrode layer (silver electrode, with a thickness of about 0.4 μm) was formed on the second dielectric layer by coating.

Finally, the lamination of the first electrode layer, the first dielectric layer, the second dielectric layer, and the second electrode layer was subjected to a release process, obtaining Capacitor (7).

Next, the capacitance of Capacitor (7) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (7) was determined by the capacitance (the capacitance of the Capacitor (7) at 25° C. was considered as 100%). The results are shown in Table 3. In addition, the capacitance of Capacitor (7) was measured by LCR (inductor-capacitor-resistor) meter (Microtest 6377 LCR) at 25° C. over a DC bias range of 0V to 100V and the capacitance change rate of Capacitor (7) was determined by the capacitance (the capacitance of the Capacitor (7) at 0V was considered as 100%). The results are shown in Table 3.

TABLE 3

|  | Weight ratio of barium titanate to polyimide (first dielectric layer) | Thickness of first dielectric layer thickness | Weight ratio of barium titanate to polyimide (second dielectric layer) | Thickness of second dielectric layer thickness | Capacitance change rate (%) (at 125° C.) | Capacitance change rate (%) (at DC bias of 100 V) |
|---|---|---|---|---|---|---|
| Example 3 | 83.3:16.7 | 45 μm | 30:70 | 8 μm | <8 | ~15 |
| Example 4 | 83.3:16.7 | 15 μm | 30:70 | 8 μm | <1 | ~10 |
| Comparative Example 3 | 83.3:16.7 | 40 μm | 50:50 (1 wt % carbon powder) | 8 μm | >30 | >100 |

As shown in Table 3, when the second dielectric layer further includes conductive powder (carbon powder), the capacitance change rate of the capacitor is greater than 30% during operation at 125° C. Furthermore, the capacitance change rate of the capacitor was greater than 100% during operation at a DC bias of 100V.

EXAMPLE 5

Example 5 was performed in the same manner as in Example 1 except that the weight ratio of barium titanate to hydrophilic polyimide in the first composition was increased from 7 to 7.5 and the thickness of the first dielectric layer was increased from 45 μm to 50 μm, obtaining Capacitor (8).

Next, the capacitance of Capacitor (8) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (8) was determined by the capacitance (the capacitance of the Capacitor (8) at 25° C. was considered as 100%). The results are shown in Table 4. In addition, the capacitance of Capacitor (8) was measured by LCR (inductor-capacitor-resistor) meter (Microtest 6377 LCR) at 25° C. over a DC bias range of 0V to 100V and the capacitance change rate of Capacitor (8) was determined by the capacitance (the capacitance of the Capacitor (8) at 0V was considered as 100%). The results are shown in Table 4.

EXAMPLE 6

Example 6 was performed in the same manner as in Example 1 except that the weight ratio of barium titanate to hydrophilic polyimide in the first composition was reduced from 7 to 2.14, obtaining Capacitor (9).

Next, the capacitance of Capacitor (9) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (9) was determined by the capacitance (the capacitance of the Capacitor (9) at 25° C. was considered as 100%). The results are shown in Table 4. In addition, the capacitance of Capacitor (9) was measured by LCR (inductor-capacitor-resistor) meter (Microtest 6377 LCR) at 25° C. over a DC bias range of 0V to 100V and the capacitance change rate of Capacitor (9) was determined by the capacitance (the capacitance of the Capacitor (9) at 0V was considered as 100%). The results are shown in Table 4.

COMPARATIVE EXAMPLE 4

Comparative Example 4 was performed in the same manner as in Example 1 except that the weight ratio of barium titanate to hydrophilic polyimide in the first composition was increased from 7 to 11.66. Since the lamination of the first electrode layer, the first dielectric layer, the second dielectric layer, and the second electrode layer could not be separated from the substrate after the release process (the lamination was broken after the release process)(although the lamination exhibited a capacitance), no capacitor was obtained.

COMPARATIVE EXAMPLE 5

Comparative Example 5 was performed in the same manner as in Example 1 except that the weight ratio of barium titanate to hydrophilic polyimide in the first composition was reduced from 7 to 1.8, obtaining Capacitor (10).

Next, the capacitance of Capacitor (10) was measured by LCR (inductor-capacitor-resistor) meter (Microtest 6377 LCR) at a voltage of 1V and a working frequency of 1 kHz over a temperature range of 25° C. to 125° C. and the capacitance change rate of Capacitor (10) was determined by the capacitance (the capacitance of the Capacitor (10) at 25° C. was considered as 100%). The results are shown in Table 4. In addition, the capacitance of Capacitor (10) was measured by LCR (inductor-capacitor-resistor) meter (Microtest 6377 LCR) at 25° C. over a DC bias range of 0V to 100V and the capacitance change rate of Capacitor (10) was determined by the capacitance (the capacitance of the Capacitor (10) at 0V was considered as 100%). The results are shown in Table 4.

TABLE 4

| | Weight ratio of barium titanate to polyimide (first dielectric layer) | Thickness of first dielectric layer | Weight ratio of barium titanate to polyimide (second dielectric layer) | Thickness of second dielectric layer | Capacitance change rate (%) (at 125° C.) | Capacitance change rate (%) (at DC bias of 100 V) |
|---|---|---|---|---|---|---|
| Example 5 | 88.2:11.8 | 50 μm | 50:50 | 8 μm | <2 | ~12 |
| Example 6 | 68.2:31.8 | 45 μm | 50:50 | 8 μm | <1 | ~13 |
| Comparative Example 5 | 64.3:35.7 | 45 μm | 50:50 | 8 μm | <2 | ~16 |

As shown in Table 4, when the weight ratio of the first dielectric powder to the first organic resin is less than 2.0, the capacitance change rate of the capacitor was greater than 16% during operation at a DC bias of 100V.

Accordingly, by means of specific dielectric powder content of the first dielectric layer and the second dielectric layer, the capacitor of the disclosure exhibits a superior DC bias characteristic (i.e. the capacitor has a capacitance change rate not greater than 10% during operation at a bias of 100V) and satisfies the X7R TCC (temperature coefficient of capacitance) requirements (have a capacitance change rate over a temperature range of −55° C. to 125° C., which does not vary by more than ±15%) standardized by Electronics Industry Alliance (EIA).

It will be clear that various modifications and variations can be made to the disclosed methods and materials. It is intended that the specification and examples be considered as exemplary only, with the true scope of the disclosure being indicated by the following claims and their equivalents.

What is claimed is:

1. A capacitor, comprising:
    a first electrode layer and a second electrode layer; and
    a first dielectric layer and a second dielectric layer, disposed between the first electrode layer and the second electrode layer, wherein the first dielectric layer comprises a first dielectric powder and a first organic resin, and the second dielectric layer comprises a second dielectric powder and a second organic resin, and wherein the weight ratio of the first dielectric powder to the first organic resin is greater than the weight ratio of the second dielectric powder to the second organic resin, wherein the first dielectric layer directly contacts the first electrode layer and the second dielectric layer directly contacts the second electrode layer,
    wherein the first electrode layer is encapsulated by the first dielectric layer on all sides but one, and wherein the first organic resin and the second organic resin are polyimide.

2. The capacitor as claimed in claim 1, wherein the weight ratio of the first dielectric powder to the first organic resin is from 2.0 to 11.6.

3. The capacitor as claimed in claim 1, wherein the weight ratio of the second dielectric powder to the second organic resin is from 0.1 to 1.

4. The capacitor as claimed in claim 1, wherein the first dielectric powder and the second dielectric powder are independently barium titanate, strontium titanate, barium strontium titanate, or a combination thereof.

5. The capacitor as claimed in claim 1, wherein the first electrode layer and the second electrode layer are independently aluminum, silver, gold, copper, nickel, platinum, or an alloy thereof.

6. The capacitor as claimed in claim 1, wherein the thickness of the first dielectric layer is from 0.105 μm to 52.5 μm, and the thickness of the second dielectric layer is from 0.1 μm to 50 μm.

7. The capacitor as claimed in claim 1, wherein the ratio of the thickness of the first dielectric layer to the thickness of the second dielectric layer is from 6.5 to 1.05.

8. The capacitor as claimed in claim 1, wherein the capacitor has a capacitance change rate not greater than 10% at a bias of 100V.

9. The capacitor as claimed in claim 1, wherein the capacitor has a capacitance change rate not greater than 15% at a temperature of 125° C.

\* \* \* \* \*